United States Patent Office 3,487,651
Patented Jan. 6, 1970

---

3,487,651
CONCENTRATING ISOTOPES OF NITROGEN, OXYGEN AND CARBON IN A METHANE AND NITRIC OXIDE MIXTURE
Kuno Schleich, Zollikerber, and Werner Meier, Winterthur, Switzerland, assignors to Ciba Limited, Basel, Switzerland, a Swiss company
Filed Feb. 16, 1967, Ser. No. 616,688
Claims priority, application Switzerland, Feb. 18, 1966, 242,416
Int. Cl. F25j 3/02; B01d 3/36
U.S. Cl. 62—11        4 Claims

ABSTRACT OF THE DISCLOSURE

Naturally occurring isotopes of nitrogen, oxygen, and carbon are separated by fractional distillation of an azeotropic liquid admixture of methane and nitric oxide (NO). Heavy isotopes of carbon, nitrogen and/or oxygen are useful as tracers.

BACKGROUND OF THE INVENTION

The naturally occurring heavy isotope of nitrogen $^{15}N$ and the heavy isotopes of oxygen $^{17}O$ and $^{18}O$ can be used as tracers and are of great importance to research in the fields of chemistry and biology because radioactive isotopes of these elements having a useful and practical half life period are not yet available. Also useful is the $^{13}C$ isotope of caron. Various processes are available for the concentration of such isotopes including concentration by rectification. However, difficulties are encountered in the application of rectification processes to the separation of isotopes of the aforementioned elements because of their extremely small vapor pressure differences.

Such difficulties can be overcome to a large extent when the isotopes of nitrogen and oxygen are separated or concentrated by fractionally distilling liquid nitric oxide in accordance with the teachings of U.S. Patent 3,134,643. It has now been found, however, that the separation factor for the isotopes of nitrogen and oxygen can be further increased by performing the fractional distillation in accordance with the process of the present invention.

The present method of separation or concentration of the isotopes also makes possible an economically advantageous means for concentrating $^{17}O$, a relatively rare oxygen isotope present only in very small amounts in nitric oxide. This particular oxygen isotope is a very valuable research tool since it is the only known oxygen isotope possessing a nuclear magnetic moment which causes radio-frequency absorption in a uniform magnetic field. Thus the oxygen isotope $^{17}O$ can be detected by nuclear magnetic resonance measurements.

SUMMARY OF THE INVENTION

Isotopes of carbon, nitrogen, and oxygen can be readily concentrated and separated by fractionally distilling a liquid mixture of methane and nitric oxide (NO). Preferably the methane and the nitric oxide are admixed in an amount so as to form a binary azeotrope which is then fractionally distilled. The lighter fractions, i.e., the fractions containing the relatively lighter isotopes are withdrawn from the top of the distillation column and the heavier fractions are reclaimed from the reboiler of the fractional distillation column. The methane and the nitric oxide in any given fraction can be separated by conventional techniques, and the particular isotopes either removed from the nitric oxide or converted into a specific compound adapted for the desired purpose.

The heavy isotopes of nitrogen and/or oxygen and/or carbon produced by the distillation process of this invention are useful as tracers for research purposes.

DETAILED DESCRIPTION

Any nitric oxide containing the desired isotopes is suitable as starting material for the preparation of the methane-nitric oxide mixture. Of course, the higher the concentration of the desired isotopes of nitrogen and/or oxygen in the starting material, the more desirable it is for the purposes of separation.

A nitric oxide suitable as a starting material for the process of this invention can be obtained by disproportionation of dinitrogen tetroxide with water, the tetroxide being a natural source material for nitric oxide, from which the latter can be obtained according to the reaction:

$$3N_2O_4 + 2H_2O = 4HNO_3 + 2NO$$

In addition, also a suitable nitric oxide for the purposes of the present invention is a nitric oxide already somewhat enriched in the heavy isotopes of oxygen and nitrogen in accordance with the teachings of U.S. Patent 3,134,643. Fractions further enriched in the desired heavy isotopes can be produced in this manner.

The liquid starting mixture of nitric oxide and methane can be prepared in any convenient manner. Usually the desired amount of each compound is admixed in gaseous form and then the resulting mixture condensed.

Figure 1:
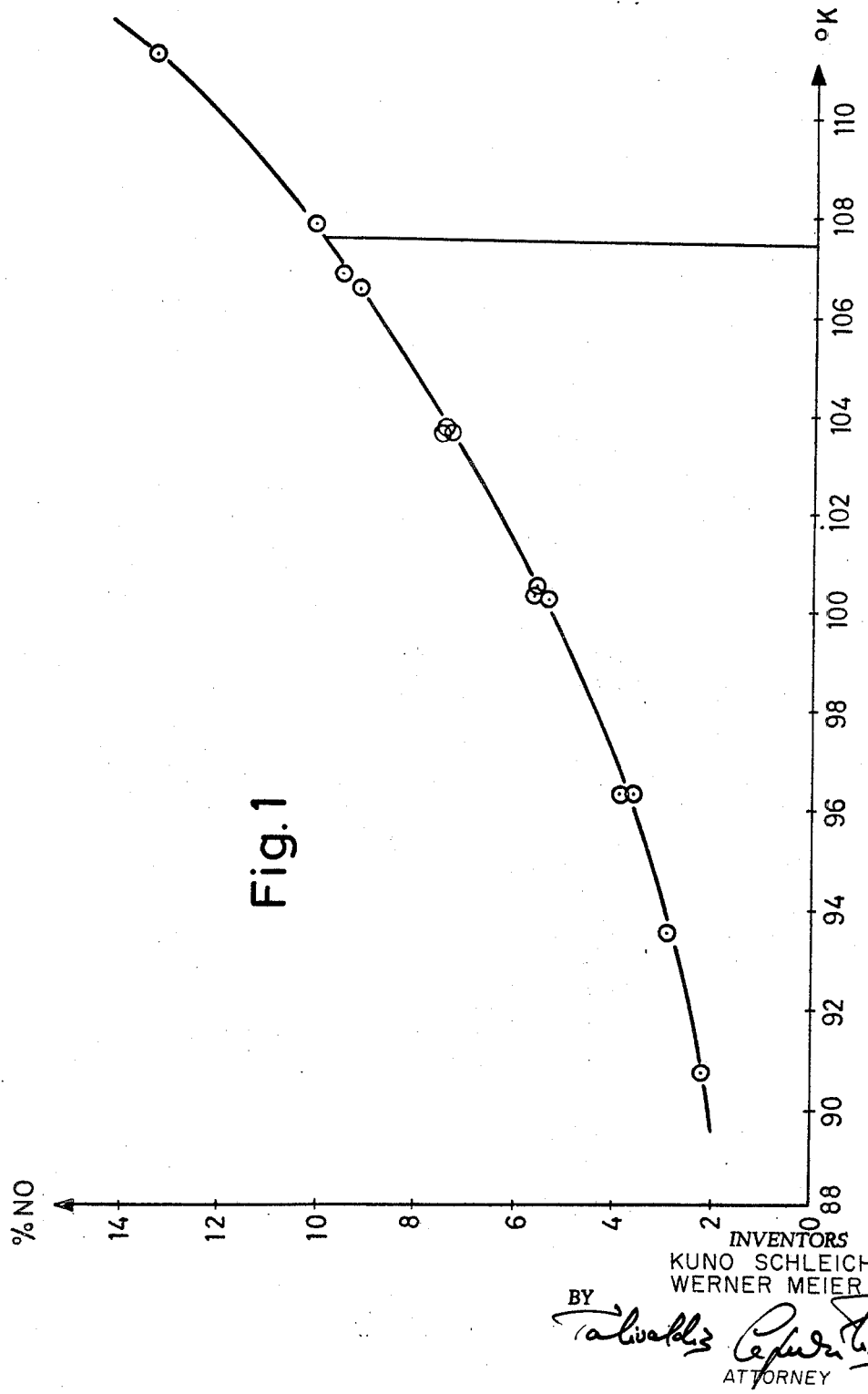
FIGURE 1 is a graphical representation of the composition of the methane-nitric oxide azeotrope as a function of absolute temperature, expressed in degrees Kelvin.

When a liquid mixture of nitric oxide and methane is rectified by fractional distillation it has been found that an azeotropic or constant-boiling mixture develops, the composition of the azeotropic mixture being a function of temperature as shown in FIG. 1 of the drawings. The pressure and temperature dependency of the azeotropic mixture of nitric oxide and methane is further shown in Table I below:

TABLE I

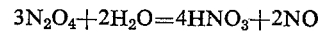

| Pressure, mm. of Hg: | Mole percent of NO in CH$_4$ | Temperature, ° K |
|---|---|---|
| 563 | 10.26 | 107.8 |
| 500 | 9.32 | 106.5 |
| 380 | 7.54 | 103.7 |
| 273 | 5.67 | 100.5 |
| 510 | 9.69 | 106.8 |
| 378 | 7.58 | 103.6 |
| 375 | 7.40 | 103.6 |
| 265 | 5.75 | 100.3 |
| 262 | 5.40 | 100.2 |
| 86 | 2.21 | 90.7 |
| 173 | 3.66 | 96.3 |
| 173 | 3.93 | 96.3 |
| 125 | 2.93 | 93.5 |
| 786 | 13.50 | 111.2 |

From the data set forth in Table I, above, it can be seen that at, for example, 90.7° K. upon rectification the lowest attainable nitric oxide concentration in methane is about 2.21 mole percent. A further separation of nitric oxide and methane can be accomplished below the melting point by means of sublimation. It is not known whether the separation in such a case is in accordance with the partial pressures of the pure components, however. A partial separation into pure methane and an azeotropic mixture can be achieved by elevation of the temperature since at the head of the distillation column a mixture composition corresponding to the particular temperature is established.

While the fractional distillation of the liquid mixture of methane and nitric oxide can be carried out at any convenient temperature and pressure, it is preferred to carry out the rectification at a temperature in the range from about 106° to about 109° K. at which temperatures the equilibrium pressure in the distallation column ranges from about 500 to about 600 millimeters of mercury. It has been found that within the preferred temperature range the separation factor is maximized and is about two to three times higher than when liquid nitric oxide is rectified alone.

In addition to the high separation factor attainable, the instant procedure also has the advantage that only a relatively small amount of nitric oxide is necessary to practice the invention. Thus relatively small amounts of nitric oxide can be processed to yield relatively large amounts of the desired isotopes. This is especially meaningful when a previously enriched, and thus expensive, nitric oxide is employed, or when only small amounts of the desired heavy isotopes are required.

After rectification the nitric oxide can be separated from the nitric oxide-methane mixture in conventional manner. For example, the nitric oxide can be separated by absorption on copper halides in an organic solution at a temperature of about $-10°$ C. A preferred solvent for this purpose is acetonitrile ($CH_3CN$); however, other solvents may be employed. In a typical absorption procedure when a mixture of nitric oxide and methane is added to an acetonitrile-copper halide solution at about $-10°$ C. the nitric oxide is quantitatively absorbed within a few minutes. When the solution is thereafter cooled to about $-80°$ C. pure methane can be drawn off. Nitric oxide can then be desorbed from copper halides at about 40° C. and then freed from acetonitrile by cooling to about $-80°$ C. in a suitable cooling chamber.

A further advantage of the instant process is that not only can the heavy isotopes of oxygen and/or nitrogen be concentrated but also the heavy isotope $^{13}C$ of carbon.

Figure 2:
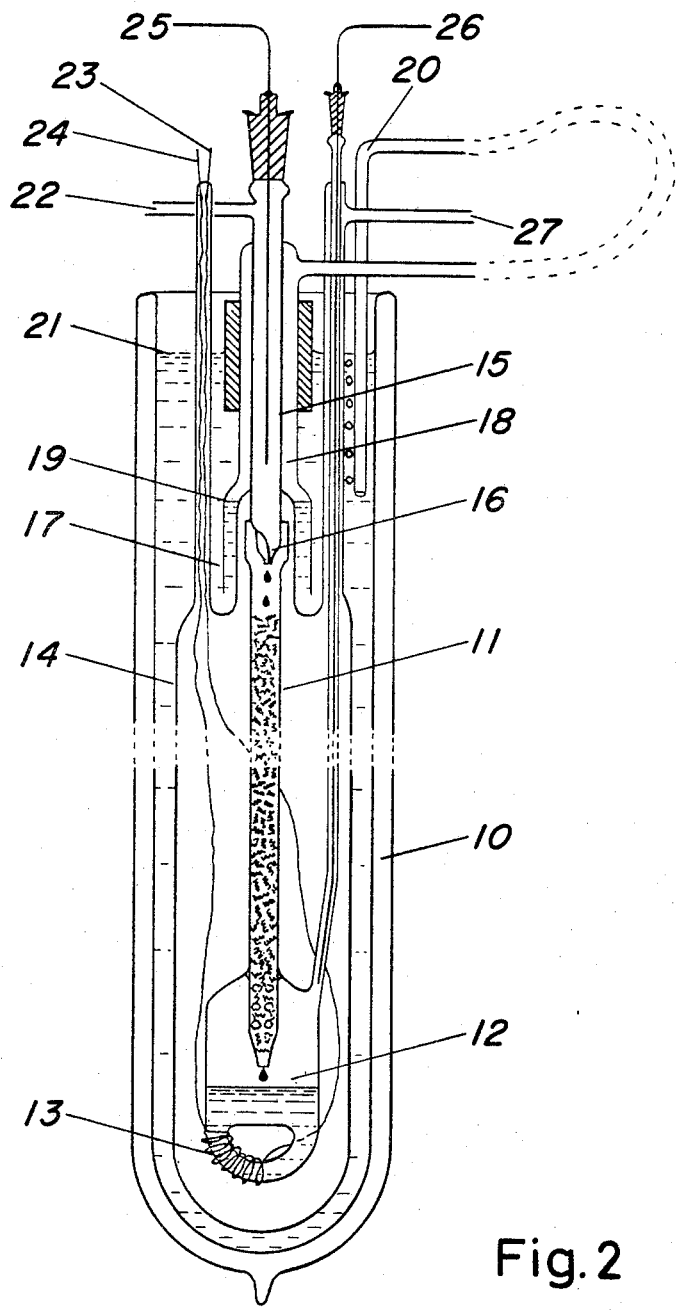
FIGURE 2 is an elevation of a laboratory apparatus, partly broken away, which can be employed in carrying out the process of the present invention.

Referring to the drawings, FIG. 2 shows a laboratory apparatus that can be employed in carrying out the instant process. The apparatus comprises a Dewar vessel 10 filled with liquid nitrogen into which is situated a packed column 11. At the lower end of the column and communicating therewith is a reboiler 12 equipped with a heating coil 13. The column 11 and the reboiler 12 are enclosed in an envelope 14 evacuated through port 27. A gas condenser 15 is situated on top of the packed column 11 and is provided with a drain 16 which discharges gas condensate into the packed column 11. A bell 17 surrounds the condenser 15 and traps liquid nitrogen vapor in space 18 surrounding the condenser 15, thereby preventing the liquid nitrogen in the Dewar flask 10 from touching the walls of the condenser 15. The level 19 of liquid nitrogen in the bell 17 can be regulated by the height of the dip tube 20 independently of the level 21 of liquid nitrogen in the Dewar flask 10 as long as level 21 is higher than level 19. The methane-nitric oxide mixture to be condensed enters through entrance port 22, and power input to the heating coil 13 of the reboiler 12 is accomplished through terminals 23 and 24. A temperature probe 25 is situated in the condenser 15 and another temperature probe 26 is situated in the reboiler 12.

EXAMPLE I

In the apparatus shown in FIG. 2, provided with a column 20 millimeters in diameter and 68 centimeters long, packed with a 2 x 2 Brunswick coil of 0.1-millimeter stainless steel, was fractionally distilled a liquid mixture of 9.5 mole percent nitric oxide and 90.5 mole percent methane (10 liters). The concentration of $^{15}N$ in the mixture was 3.4 atomic percent. The liquid mixture was obtained by first condensing the corresponding gaseous mixture in the same apparatus.

At a heat input of 1.34 watts an equilibrium pressure of 510 mm. of Hg, corresponding to a boiling temperature of 106.7° K., was established. Upon carrying out the fractional distillation a product containing 0.21 atomic percent of $^{15}N$ was withdrawn, and the $^{15}N$ concentration in the reboiler reached 8.0 atomic percent. The separation factor for this rectification was found to be 41.

EXAMPLE II

In a manner similar to Example I, 17 liters of the same mixture of nitric oxide and methane was condensed and then fractionally distilled. The content of the heavy isotopes in the mixture expressed in terms of atomic percent was as follows: 1.13 percent $^{13}C$, 3.42 percent $^{15}N$ 0.62 percent $^{17}O$, and 5.18 percent $^{18}O$. After equilibrium was established, the concentration of the isotopes in the product withdrawn from the top of the column was 0.8 percent $^{13}C$, 0.17 percent $^{15}N$, 0.083 percent $^{17}O$, and 0.075 percent $^{18}O$. On the other hand, the concentration of the product remaining in the reboiler was 1.28 percent $^{13}C$, 6.14 percent $^{15}N$, 1.07 percent $^{17}O$, and 10.25 percent $^{18}O$. The separation factors, Q of the various systems were found to be as follows:

$Q(^{14}N/^{15}N) = 38.0$
$Q(^{16}O/^{17}O) = 14.4$
$Q(^{16}O/^{18}O) = 154.0$
$Q(^{12}C/^{13}C) = 1.55$

EXAMPLE III

For comparison purposes two separate runs were carried out in the apparatus employed in Examples I and II under the same conditions; one run with pure nitric oxide and the other with pure methane. The heat input to the reboiler was adjusted so that the same mole amount as in the rectification of the azeotropic mixture was vaporized per hour, and amounted to 2.22 watts for nitric oxide and 1.31 watts for methane. The vapor pressure was also maintained at 510 millimeters of mercury.

After equilibrium was achieved, a product containing 0.36 atomic percent $^{15}N$ was stripped from the top of the column, and a product containing 5.60 atomic percent $^{15}N$ remained in the reboiler for the run with pure nitric oxide. The separation factor was found to be 16.5.

In the run with pure methane, a product containing 0.94 atomic percent $^{13}C$ was stripped from the top of the column, and a product containing 1.36 atomic percent $^{13}C$ remained in the reboiler. The separation factor was found to be 1.44.

We claim:
1. A process for concentrating natural heavy isotopes of elements which are members of the group consisting of oxygen, nitrogen, and carbon which comprises rectifying by fractional distillation a liquid mixture of methane and nitric oxide containing at least one isotope selected from the group consisting of $^{13}C$, $^{15}N$, $^{17}O$, and $^{18}O$.

2. The process in accordance with claim 1 wherein a substantially azeotropic liquid mixture of methane and nitric oxide is rectified by fractional distillation.

3. The process in accordance with claim 1 wherein the liquid mixture of methane and nitric oxide is rectified at a temperature in the range from about 106° K. to about 109° K. and at a pressure in the range from about 500 to about 600 millimeters of mercury.

4. The process in accordance with claim 1 wherein a mixture of methane and nitric oxide enriched in at least one of the naturally occurring heavy isotopes of oxygen and nitrogen is rectified by fractional distillation.

References Cited

UNITED STATES PATENTS

| | | | |
|---|---|---|---|
| 2,780,526 | 2/1957 | Fleck | 23—209.1 |
| 2,796,330 | 6/1957 | Crist et al. | 23—221 |
| 2,923,601 | 2/1960 | Taylor et al. | 23—160 |
| 3,134,643 | 5/1964 | Clusius | 23—157 |

NORMAN YUDKOFF, Primary Examiner

V. W. PRETKA, Assistant Examiner

U.S. Cl. X.R.

62—28; 23—157, 307; 176—14; 203—70